(12) United States Patent
Braho et al.

(10) Patent No.: US 8,756,059 B2
(45) Date of Patent: *Jun. 17, 2014

(54) METHOD AND SYSTEM FOR CONSIDERING INFORMATION ABOUT AN EXPECTED RESPONSE WHEN PERFORMING SPEECH RECOGNITION

(75) Inventors: Keith Braho, Murrysville, PA (US); Amro El-Jaroudi, Pittsburgh, PA (US); Jeffrey Pike, Murrysville, PA (US)

(73) Assignee: Vocollect, Inc., Pittsburgh, PA (US)

( * ) Notice: Subject to any disclaimer, the term of this patent is extended or adjusted under 35 U.S.C. 154(b) by 736 days.

This patent is subject to a terminal disclaimer.

(21) Appl. No.: 12/982,563

(22) Filed: Dec. 30, 2010

(65) Prior Publication Data

US 2011/0093269 A1    Apr. 21, 2011

Related U.S. Application Data

(63) Continuation of application No. 11/051,825, filed on Feb. 4, 2005, now Pat. No. 7,865,362.

(51) Int. Cl.
*G10L 15/065* (2013.01)

(52) U.S. Cl.
USPC .......................................................... 704/251

(58) Field of Classification Search
USPC .......................................................... 704/251
See application file for complete search history.

(56) References Cited

U.S. PATENT DOCUMENTS

| | | | |
|---|---|---|---|
| 4,882,757 A | 11/1989 | Fisher et al. | |
| 4,928,302 A | 5/1990 | Kaneuchi et al. | |
| 4,959,864 A | 9/1990 | Van Nes et al. | |
| 5,127,043 A | 6/1992 | Hunt et al. | |
| 5,127,055 A | 6/1992 | Larkey | |
| 5,230,023 A | 7/1993 | Nakano | |
| 5,297,194 A | 3/1994 | Hunt et al. | |
| 5,428,707 A | 6/1995 | Gould et al. | |
| 5,457,768 A | 10/1995 | Tsuboi | |
| 5,465,317 A | 11/1995 | Epstein | |
| 5,488,652 A | 1/1996 | Bielby et al. | |

(Continued)

FOREIGN PATENT DOCUMENTS

| | | |
|---|---|---|
| EP | 086857 | 9/1998 |
| EP | 0905677 | 3/1999 |

(Continued)

OTHER PUBLICATIONS

Smith, Ronnie W., An Evaluation of Strategies for Selective Utterance Verification for Spoken Natural Language Dialog, Proc. Fifth Conference on Applied Natural Language Processing (ANLP), 1997, 41-48.

(Continued)

*Primary Examiner* — Susan McFadden
(74) *Attorney, Agent, or Firm* — Additon, Higgins, Pendleton & Ashe, P. A.

(57) ABSTRACT

A speech recognition system receives and analyzes speech input from a user in order to recognize and accept a response from the user. Under certain conditions, information about the response expected from the user may be available. In these situations, the available information about the expected response is used to modify the behavior of the speech recognition system by taking this information into account. The modified behavior of the speech recognition system comprises adjusting the rejection threshold when speech input matches the predetermined expected response.

18 Claims, 3 Drawing Sheets

(56) References Cited

U.S. PATENT DOCUMENTS

| | | | |
|---|---|---|---|
| 5,566,272 A | 10/1996 | Brems et al. | |
| 5,602,960 A | 2/1997 | Hon et al. | |
| 5,625,748 A * | 4/1997 | McDonough et al. | 704/251 |
| 5,640,485 A | 6/1997 | Ranta | |
| 5,644,680 A | 7/1997 | Bielby et al. | |
| 5,651,094 A | 7/1997 | Takagi et al. | |
| 5,684,925 A | 11/1997 | Morin et al. | |
| 5,710,864 A | 1/1998 | Juang et al. | |
| 5,717,826 A | 2/1998 | Setlur et al. | |
| 5,737,489 A | 4/1998 | Chou et al. | |
| 5,737,724 A | 4/1998 | Atal et al. | |
| 5,774,841 A | 6/1998 | Salazar et al. | |
| 5,774,858 A | 6/1998 | Taubkin et al. | |
| 5,797,123 A | 8/1998 | Chou et al. | |
| 5,799,273 A | 8/1998 | Mitchell et al. | |
| 5,832,430 A | 11/1998 | Lleida et al. | |
| 5,839,103 A | 11/1998 | Mammone et al. | |
| 5,842,163 A | 11/1998 | Weintraub | |
| 5,893,057 A | 4/1999 | Fujimoto et al. | |
| 5,893,902 A | 4/1999 | Transue et al. | |
| 5,895,447 A | 4/1999 | Ittycheriah et al. | |
| 5,899,972 A | 5/1999 | Miyazawa et al. | |
| 5,946,658 A | 8/1999 | Miyazawa et al. | |
| 5,960,447 A | 9/1999 | Holt et al. | |
| 6,003,002 A | 12/1999 | Netsch | |
| 6,006,183 A | 12/1999 | Lai | |
| 6,073,096 A | 6/2000 | Gao et al. | |
| 6,076,057 A | 6/2000 | Narayanan et al. | |
| 6,088,669 A | 7/2000 | Maes | |
| 6,094,632 A | 7/2000 | Hattori | |
| 6,101,467 A | 8/2000 | Bartosik | |
| 6,122,612 A | 9/2000 | Goldberg | |
| 6,151,574 A | 11/2000 | Lee et al. | |
| 6,182,038 B1 | 1/2001 | Balakrishnan et al. | |
| 6,192,343 B1 | 2/2001 | Morgan et al. | |
| 6,205,426 B1 | 3/2001 | Nguyen et al. | |
| 6,230,129 B1 | 5/2001 | Morin | |
| 6,233,555 B1 | 5/2001 | Parthasarathy | |
| 6,233,559 B1 | 5/2001 | Balakrishnan | |
| 6,243,713 B1 | 6/2001 | Nelson et al. | |
| 6,246,980 B1 | 6/2001 | Glorion et al. | |
| 6,292,782 B1 | 9/2001 | Weideman | |
| 6,330,536 B1 | 12/2001 | Parthasarathy | |
| 6,374,212 B2 | 4/2002 | Phillips et al. | |
| 6,374,221 B1 | 4/2002 | Haimi-Cohen | |
| 6,377,662 B1 | 4/2002 | Hunt et al. | |
| 6,377,949 B1 | 4/2002 | Gilmour | |
| 6,397,180 B1 | 5/2002 | Jaramillo et al. | |
| 6,421,640 B1 | 7/2002 | Dolfing | |
| 6,438,519 B1 | 8/2002 | Campbell et al. | |
| 6,438,520 B1 | 8/2002 | Curt et al. | |
| 6,487,532 B1 | 11/2002 | Schoofs et al. | |
| 6,496,800 B1 | 12/2002 | Kong | |
| 6,505,155 B1 | 1/2003 | Vanbuskirk et al. | |
| 6,507,816 B2 | 1/2003 | Ortega | |
| 6,526,380 B1 | 2/2003 | Thelen et al. | |
| 6,539,078 B1 | 3/2003 | Hunt et al. | |
| 6,542,866 B1 | 4/2003 | Jiang | |
| 6,567,775 B1 | 5/2003 | Maali | |
| 6,571,210 B2 | 5/2003 | Hon | |
| 6,581,036 B1 | 6/2003 | Varney, Jr. | |
| 6,587,824 B1 | 7/2003 | Everhart et al. | |
| 6,594,629 B1 | 7/2003 | Basu et al. | |
| 6,598,017 B1 | 7/2003 | Yamamoto et al. | |
| 6,606,598 B1 | 8/2003 | Holthouse et al. | |
| 6,629,072 B1 | 9/2003 | Thelen | |
| 6,675,142 B2 | 1/2004 | Ortega et al. | |
| 6,701,293 B2 | 3/2004 | Bennett | |
| 6,732,074 B1 | 5/2004 | Kuroda | |
| 6,735,562 B1 | 5/2004 | Zhang et al. | |
| 6,754,627 B2 | 6/2004 | Woodward | |
| 6,766,295 B1 | 7/2004 | Murveit et al. | |
| 6,799,162 B1 | 9/2004 | Goronzy et al. | |
| 6,832,224 B2 | 12/2004 | Gilmour | |
| 6,834,265 B2 | 12/2004 | Balasuriya | |
| 6,839,667 B2 | 1/2005 | Reich | |
| 6,856,956 B2 | 2/2005 | Thrasher | |
| 6,868,381 B1 | 3/2005 | Peters et al. | |
| 6,876,987 B2 | 4/2005 | Bahler | |
| 6,879,956 B1 | 4/2005 | Honda et al. | |
| 6,882,972 B2 | 4/2005 | Kompe et al. | |
| 6,910,012 B2 | 6/2005 | Hartley | |
| 6,917,918 B2 | 7/2005 | Rockenbeck et al. | |
| 6,922,466 B1 | 7/2005 | Peterson et al. | |
| 6,922,669 B2 | 7/2005 | Schalk | |
| 6,941,264 B2 | 9/2005 | Konopka | |
| 6,961,700 B2 | 11/2005 | Mitchell et al. | |
| 6,961,702 B2 | 11/2005 | Dobler et al. | |
| 6,985,859 B2 | 1/2006 | Morin | |
| 6,999,931 B2 | 2/2006 | Zhou | |
| 7,031,918 B2 | 4/2006 | Hwang | |
| 7,035,800 B2 | 4/2006 | Tapper | |
| 7,039,166 B1 | 5/2006 | Peterson et al. | |
| 7,050,550 B2 | 5/2006 | Steinbiss | |
| 7,058,575 B2 | 6/2006 | Zhou | |
| 7,062,435 B2 | 6/2006 | Tzirkel-Hancock | |
| 7,062,441 B1 | 6/2006 | Townshend | |
| 7,065,488 B2 | 6/2006 | Yajima | |
| 7,069,513 B2 | 6/2006 | Damiba | |
| 7,072,750 B2 | 7/2006 | Pi | |
| 7,072,836 B2 | 7/2006 | Shao | |
| 7,103,542 B2 | 9/2006 | Doyle | |
| 7,103,543 B2 | 9/2006 | Hernandez-Abrego et al. | |
| 7,203,644 B2 | 4/2007 | Anderson | |
| 7,203,651 B2 | 4/2007 | Baruch et al. | |
| 7,216,148 B2 | 5/2007 | Matsunami et al. | |
| 7,225,127 B2 | 5/2007 | Lucke | |
| 7,266,492 B2 | 9/2007 | Goodman | |
| 7,386,454 B2 | 6/2008 | Gopinath et al. | |
| 7,392,186 B2 | 6/2008 | Duan et al. | |
| 7,406,413 B2 | 7/2008 | Geppert et al. | |
| 7,454,340 B2 | 11/2008 | Sakai | |
| 7,457,745 B2 | 11/2008 | Kadambe et al. | |
| 7,542,907 B2 | 6/2009 | Epstein | |
| 7,565,282 B2 | 7/2009 | Carus et al. | |
| 7,684,984 B2 | 3/2010 | Kemp | |
| 7,827,032 B2 | 11/2010 | Braho et al. | |
| 7,865,362 B2 * | 1/2011 | Braho et al. | 704/251 |
| 7,895,039 B2 | 2/2011 | Braho et al. | |
| 7,949,533 B2 | 5/2011 | Braho et al. | |
| 7,983,912 B2 | 7/2011 | Hirakawa et al. | |
| 8,200,495 B2 * | 6/2012 | Braho et al. | 704/275 |
| 8,392,190 B2 * | 3/2013 | Chen et al. | 704/256.1 |
| 8,612,235 B2 * | 12/2013 | Braho et al. | 704/275 |
| 2002/0138274 A1 | 9/2002 | Sharma | |
| 2002/0143540 A1 | 10/2002 | Malayath | |
| 2002/0152071 A1 | 10/2002 | Chaiken et al. | |
| 2002/0178004 A1 | 11/2002 | Chang | |
| 2002/0198712 A1 | 12/2002 | Hinde et al. | |
| 2003/0023438 A1 | 1/2003 | Schram et al. | |
| 2003/0120486 A1 | 6/2003 | Brittan et al. | |
| 2003/0191639 A1 | 10/2003 | Mazza | |
| 2003/0220791 A1 | 11/2003 | Toyama | |
| 2004/0215457 A1 | 10/2004 | Meyer | |
| 2005/0055205 A1 | 3/2005 | Jersak et al. | |
| 2005/0071161 A1 | 3/2005 | Shen | |
| 2005/0080627 A1 | 4/2005 | Hennebert et al. | |
| 2007/0073540 A1 | 3/2007 | Hirakawa et al. | |
| 2011/0029312 A1 | 2/2011 | Braho et al. | |
| 2011/0029313 A1 | 2/2011 | Braho et al. | |
| 2011/0161082 A1 | 6/2011 | Braho et al. | |
| 2011/0161083 A1 | 6/2011 | Braho et al. | |

FOREIGN PATENT DOCUMENTS

| | | |
|---|---|---|
| EP | 1011094 | 6/2000 |
| EP | 1377000 | 1/2004 |
| JP | 63179398 A | 7/1988 |
| JP | 64004798 | 9/1989 |
| JP | 04296799 A | 10/1992 |
| JP | 6059828 A | 4/1994 |
| JP | 6130985 A | 5/1994 |
| JP | 6161489 A | 6/1994 |
| JP | 07013591 A | 1/1995 |

(56) References Cited

FOREIGN PATENT DOCUMENTS

| | | |
|---|---|---|
| JP | 07199985 A | 8/1995 |
| JP | 11175096 A | 2/1999 |
| JP | 2000181482 A | 6/2000 |
| JP | 2001042886 A | 2/2001 |
| JP | 2001343992 A | 12/2001 |
| JP | 2001343994 A | 12/2001 |
| JP | 2002328696 A | 11/2002 |
| JP | 2003177779 A | 6/2003 |
| JP | 2004126413 A | 4/2004 |
| JP | 2004334228 A | 11/2004 |
| JP | 2005173157 A | 6/2005 |
| JP | 2005331882 A | 12/2005 |
| JP | 2006058390 A | 3/2006 |
| WO | WO0211121 | 2/2002 |
| WO | WO20051191193 | 12/2005 |
| WO | WO2006031752 | 3/2006 |

OTHER PUBLICATIONS

Kellner, A., et al., Strategies for Name Recognition in Automatic Directory Assistance Systems, Interactive Voice Technology for Telecommunications Applications, IVTTA '98 Proceedings, 1998 IEEE 4th Workshop, Sep. 29, 1998.

International Search Report Published Jul. 10, 2006 for WO2006/0084228.

Chengyi Zheng and Yonghong Yan, "Improving Speaker Adaptation by Adjusting the Adaptation Data Set"; 2000 IEEE International Symposium on Intelligent Signal Processing and Communication Systems. Nov. 5-8, 2000.

Christensen, "Speaker Adaptation of Hidden Markov Models using Maximum Likelihood Linear Regression", Thesis, Aalborg University, Apr. 1996.

Mokbel, "Online Adaptation of HMMs to Real-Life Conditions: A Unified Framework", IEEE Trans. on Speech and Audio Processing, May 2001.

Silke Goronzy, Krzysztof Marasek, Ralf Kompe, Semi-Supervised Speaker Adaptation, in Proceedings of the Sony Research Forum 2000, vol. 1, Tokyo, Japan, 2000.

Jie Yi, Kei Miki, Takashi Yazu, Study of Speaker Independent Continuous Speech Recognition, Oki Electric Research and Development, Oki Electric Industry Co., Ltd., Apr. 1, 1995, vol. 62, No. 2, pp. 7-12.

Osamu Segawa, Kazuya Takeda, An Information Retrieval System for Telephone Dialogue in Load Dispatch Center, IEEJ Trans. EIS, Sep. 1, 2005, vol. 125, No. 9, pp. 1438-1443.

Four-page European Search Report completed Feb. 25, 2011 for Patent Application No. 10179866.8.

Four-page European Search Report completed Feb. 28, 2011 for Patent Application No. 10179864.3.

\* cited by examiner

METHOD AND SYSTEM FOR CONSIDERING INFORMATION ABOUT AN EXPECTED RESPONSE WHEN PERFORMING SPEECH RECOGNITION

RELATED APPLICATION

This application is a continuation Application of U.S. Ser. No. 11/051,825, now U.S. Patent Publication No. 2006-0178882, filed Feb. 4, 2005, entitled "METHOD AND SYSTEM FOR CONSIDERING INFORMATION ABOUT AN EXPECTED RESPONSE WHEN PERFORMING SPEECH RECOGTNIION".

TECHNICAL FIELD

The present invention relates to speech recognition and, more particularly, to speech recognition systems for addressing likely or expected responses.

BACKGROUND ART

Speech recognition has simplified many tasks in the workplace by permitting hands-free communication with a computer as a convenient alternative to communication via conventional peripheral input/output devices. A worker may enter data by voice using a speech recognizer and commands or instructions may be communicated to the worker by a speech synthesizer. Speech recognition finds particular application in mobile computing devices in which interaction with the computer by conventional peripheral input/output devices is restricted.

For example, wireless wearable terminals can provide a worker performing work-related tasks with desirable computing and data-processing functions while offering the worker enhanced mobility within the workplace. One particular area in which workers rely heavily on such wireless wearable terminals is inventory management. Inventory-driven industries rely on computerized inventory management systems for performing various diverse tasks, such as food and retail product distribution, manufacturing, and quality control. An overall integrated management system involves a combination of a central computer system for tracking and management, and the people who use and interface with the computer system in the form of order fillers, pickers and other workers. The workers handle the manual aspects of the integrated management system under the command and control of information transmitted from the central computer system to the wireless wearable terminal.

As the workers complete their assigned tasks, a bi-directional communication stream of information is exchanged over a wireless network between wireless wearable terminals and the central computer system. Information received by each wireless wearable terminal from the central computer system is translated into voice instructions or text commands for the corresponding worker. Typically, the worker wears a headset coupled with the wearable device that has a microphone for voice data entry and an ear speaker for audio output feedback. Responses from the worker are input into the wireless wearable terminal by the headset microphone and communicated from the wireless wearable terminal to the central computer system. Through the headset microphone, workers may pose questions, report the progress in accomplishing their assigned tasks, and report working conditions, such as inventory shortages. Using such wireless wearable terminals, workers may perform assigned tasks virtually hands-free without equipment to juggle or paperwork to carry around. Because manual data entry is eliminated or, at the least, reduced, workers can perform their tasks faster, more accurately, and more productively.

An illustrative example of a set of worker tasks suitable for a wireless wearable terminal with voice capabilities may involve initially welcoming the worker to the computerized inventory management system and defining a particular task or order, for example, filling a load for a particular truck scheduled to depart from a warehouse. The worker may then answer with a particular area (e.g., freezer) that they will be working in for that order. The system then vocally directs the worker to a particular aisle and bin to pick a particular quantity of an item. The worker then vocally confirms a location and the number of picked items. The system may then direct the worker to a loading dock or bay for a particular truck to receive the order. As may be appreciated, the specific communications exchanged between the wireless wearable terminal and the central computer system can be task-specific and highly variable.

To perform speech recognition, speech recognizer algorithms analyze the received speech input using acoustic modeling and determine the likely word, or words, that were spoken (also known as the hypothesis). As part of the analysis and determination, the speech recognizer assigns confidence factors that quantitatively indicate how closely each word of the hypothesis matches the acoustic models. If the confidence factor is above the acceptance threshold, then the speech recognizer accepts the hypothesis as correctly recognized speech. If, however, the confidence factor is below the acceptance threshold, then the speech recognizer rejects or ignores the speech input. This rejection may require the user to repeat the speech input. By rejecting the hypothesis and requiring repetition of speech that was otherwise correctly recognized, this type of speech recognizer may reduce productivity and efficiency and, thereby, may waste time and money.

Accordingly, there is a need, unmet by current speech recognizer systems, for a speech recognizer that reduces unnecessary repetition. There is further a need for a speech recognizer that can accept speech input, under certain circumstances, even if the confidence factor is below the normal acceptance threshold, without sacrificing accuracy.

BRIEF DESCRIPTION OF THE DRAWINGS

The accompanying drawings, which are incorporated in and constitute a part of this Specification, illustrate embodiments of the invention and, together with the Detailed Description of the embodiments given below, serve to explain the principles of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF EMBODIMENTS OF THE INVENTION

Figure 1:
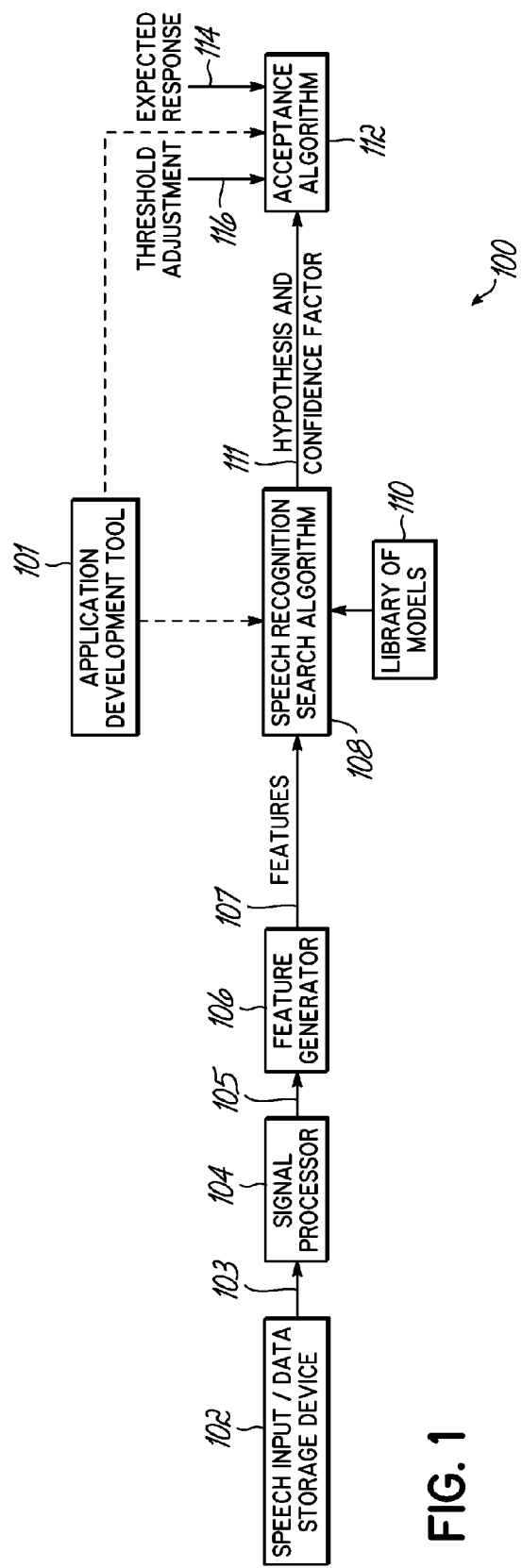
FIG. 1 illustrates a schematic view of a speech recognition system.

FIG. 1 illustrates a schematic view of a speech recognition system in accordance with the present invention. One of ordinary skill in the art will recognize that various of the functional blocks of the speech recognition system, including the inventive features, can be implemented using a variety of different technologies.

Referring to FIG. 1 in system 100, a speech signal, such as from a system user, may be captured by a speech input device 102 in a variety of conventional ways. Typically, a microphone or other electro-acoustical device senses speech input from a user and converts it into an analog voltage signal 103 that then is forwarded to a signal processor 104. As is conventionally known, the signal processor 104 includes the necessary analog-to-digital converters, filters, and equalization circuitry that converts the analog speech input 103 into a digitized stream of data 105 that can be separated into separate units for analysis. Alternatively, this audio data from device 102 can be retrieved from a data storage device. As discussed herein, the system 100 might be realized by suitable hardware and software. As such, the blocks shown in FIG. 1 are not meant to indicate separate circuits or to be otherwise limiting, but rather show the functional features and components of the system.

In particular, the signal processor 104 divides the digital stream of data that is created into a sequence of time-slices, or frames 105, each of which is then processed by a feature generator 106, thereby producing a vector, matrix, or otherwise organized set of numbers 107 representing the acoustic features of the frames. Further explanation of an exemplary speech signal processor system is provided in U.S. Pat. No. 4,882,757, entitled SPEECH RECOGNITION SYSTEM, the disclosure of which is incorporated herein, by reference, in its entirety. This patent discloses Linear Predictive Coding (LPC) coefficients to represent speech; however, other functionally equivalent methods are contemplated within the scope of the present invention as well.

A speech recognition search algorithm function 108, realized by an appropriate circuit or software in the system 100 analyzes the feature vectors 107 in an attempt to determine what hypothesis to assign to the speech input captured by input device 102. As is known in the art in one recognition algorithm, the recognition search 108 relies on probabilistic models from a library of suitable models 110 to recognize the speech input 102. Some of the models in the library 110 may be customized to a user via templates or other means, while some models may be generic to all users.

When in operation, the search algorithm 108, in essence, compares the features 107 generated in the generator 106 with reference representations of speech, or speech models, in library 110 in order to determine the word or words that best match the speech input from device 102. Part of this recognition process is to assign a confidence factor for the speech to indicate how closely the sequence of features from the search algorithm 106 matches the closest or best-matching models in library 110. As such, a hypothesis, consisting of one or more vocabulary items and associated confidence factors 111 is directed to an acceptance algorithm 112. If the confidence factor is above a defined acceptance threshold, then the recognized speech is accepted by the acceptance algorithm 112. Acceptance algorithm 112 may also be realized by an appropriate circuit or software component of the system 100. If, however, the confidence factor is not above the acceptance threshold, as utilized by the acceptance algorithm, then the acceptance algorithm 112 ignores or rejects the recognized speech or prompts the user to repeat the speech. In this instance, the user may repeat the speech to input device 102.

One common modeling technique utilized for speech recognition includes Hidden Markov Models (HMM). In speech recognition, these models use sequences of states to describe vocabulary items, which may be words, phrases, or subword units. Each state represents one or more acoustic events and serves to assign a probability to each observed feature vector. Accordingly, a path through the HMM states produce a probabilistic indication of a series of acoustic feature vectors. The model is searched such that different, competing hypotheses (or paths) are scored; a process known as acoustic matching or acoustic searching. A state S can be reached at a time T via a number of different paths. For each path reaching a particular state at a particular time, a path probability is calculated. Using the Viterbi algorithm, each path through the HMM can be assigned a probability. In particular, the best path can be assigned a probability. Furthermore, each vocabulary item or word in the best path can be assigned a probability. Each of these probabilities can be used as a confidence factor or combined with other measurements, estimates or numbers to derive a confidence factor. The path with the highest confidence factor, the hypothesis, can then be further analyzed. The confidence factor of the hypothesis or the confidence factors of each vocabulary item in the hypothesis can be compared with an acceptance threshold. As used herein, the term "word" is used to denote a vocabulary item, and thus may mean a word, a segment or part of a word, or a compound word, such as "next slot" or "say again." Therefore, the term "word" is not limited to just a single word. It should be understood that other speech recognition models are also contemplated within the scope of the present invention; for example, template matching dynamic time warping (DTW) and neural networks are two such exemplary, alternative modeling techniques.

While existing speech recognition systems adequately address the task of determining the spoken input and recognizing the speech, there are still some drawbacks in such systems as noted above. For example, all of the hypotheses generated by the system, even the best-scoring hypothesis, may have confidence factors that fall below the acceptance threshold. In such a situation, the speech is rejected and may have to be repeated. As noted, this reduces productivity and efficiency. The present invention addresses such issues and improves upon the recognition efficiency by using expected speech to modify the acceptance threshold.

More specifically, in certain environments utilizing speech recognition systems, the expected speech or expected response to be received from a user is known beforehand or can be determined. For example, when picking a part from a bin, or placing an item in a warehouse location, there can be a check-digit that verifies the location of the user or the operation being performed by the user. During the operation, the user is prompted to go to a location and speak the check-digit (or check-phrase) displayed at and associated with the location. The speech recognition system attempts to recognize the user's spoken response and compare it with this check-digit or check-phrase to confirm that the user is at the correct location before prompting the user to perform an operation, such as picking a case of product. As used herein, "check-digit" refers to the set of one or more words that are associated with a location, bin or slot for the purpose of verifying a user's location. A "check-digit" may, for example, be a three-digit number or could be non-digit words. In addition to this exemplary environment, there may be other scenarios in which a particular response or series of responses is expected from the user. Other such examples are described in US patent application 2003/0154075 and include password verification, quantity verification, and repeat/acknowledge messages. The exemplary embodiments of the present invention described below involve situations wherein one or more known expected response(s) are utilized to improve speech recognition systems. In addition to these exemplary environments, an expected response may be known in other situations when a recognizer is waiting for a response from the user. As recognized by one of ordinary skill, the principles of the present invention can be advantageous within these situations as well.

In embodiments of the present invention, this knowledge about the response that is expected from the user is utilized to modify and refine a speech recognition system to increase efficiency and productivity. In particular, the speech recognizer, as described herein, uses the information about the expected response in addition to the conventional models and probabilistic determination methods in order to accurately determine what a user has said.

Figure 2:
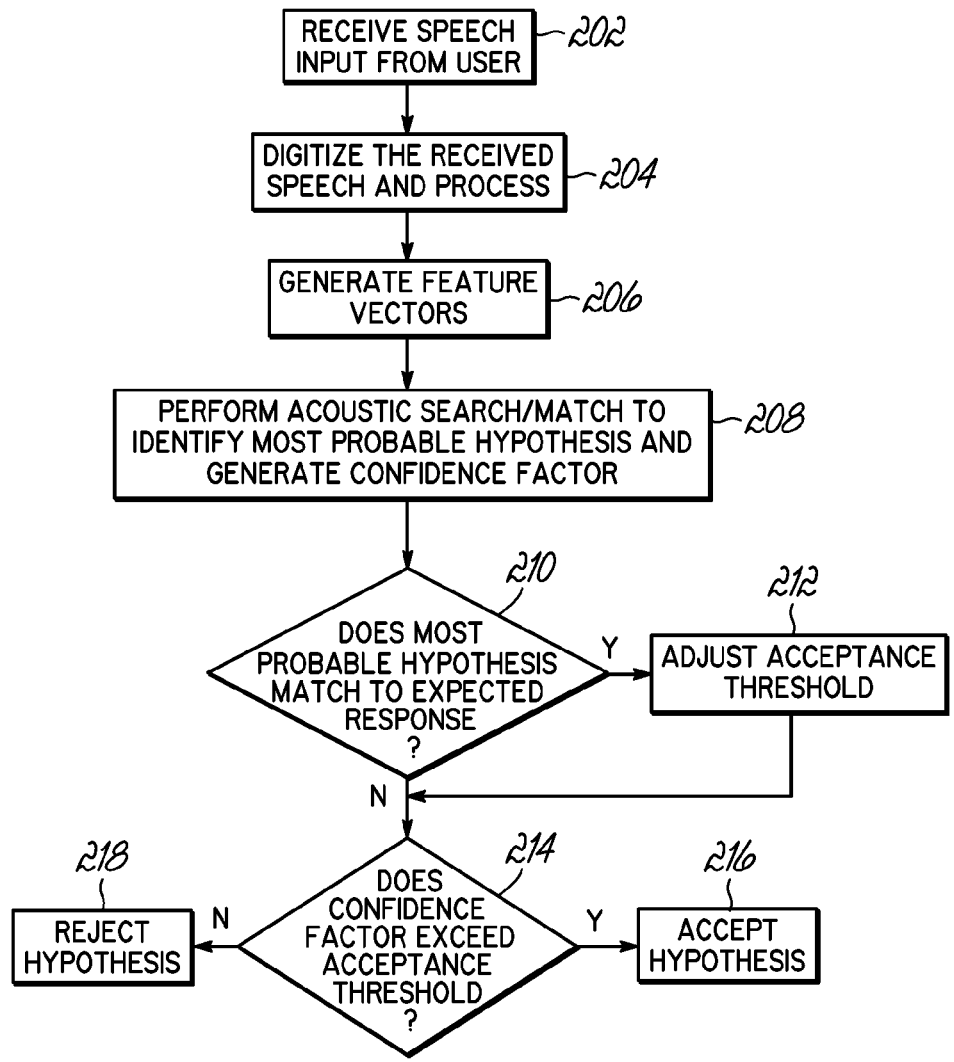
FIG. 2 illustrates a flowchart of an exemplary algorithm for modifying the behavior of the acceptance threshold of a speech recognition system based on knowledge about an expected response from a user.

FIG. 2 illustrates a flowchart of an exemplary algorithm for modifying the behavior of an acoustic match/search process of a speech recognizer in accordance with aspects of the invention. In step 202, speech input is received from the user by an appropriate device 102 or is pulled from storage. The speech input is then digitized in step 204, such as by signal processor 104. As is known in the art, the digitized speech is separated, in step 206, into time slices and converted into feature vectors, such as by feature generator 106. As explained earlier, these feature vectors correspond to information within an acoustic model that allows a search and match to be performed to identify the most likely, or most probable, sequence of words spoken by the user. Step 208 reflects the search/match routine to determine a hypothesis with the highest associated confidence factor. Such a search/match routine may be performed utilizing the speech recognition search algorithm 108 and model library 110 as shown in FIG. 1.

In accordance with the principles of the present invention, this most probable sequence, or the hypothesis with the highest confidence factor, is compared, in step 210, to an expected response that was known beforehand. Then, based upon such a comparison, the acceptance algorithm is modified. If the comparison shows that the most probable speech hypothesis matches an expected response, the hypothesis is more favorably treated. Specifically, the acceptance threshold is modified by being downwardly adjusted or lowered in order to allow speech that may otherwise be rejected to be accepted and output as recognized by system 100. In one embodiment of the invention, as discussed herein, the assumption is that the recognizer uses higher or increased confidence scores to represent a higher confidence that the speech input 102 actually matches the recognizer's hypothesis. In such a case the invention would operate to decrease the acceptance threshold based upon knowledge of an expected response to allow recognition of the spoken input. The present invention also contemplates however that the confidence scale could be inverted. That is, the recognizer would use lower or low scores to represent higher confidence. In such a case, the confidence scores must be below a defined acceptance threshold for the recognizer to accept the speech input. In this case, in accordance with aspects of the invention, the acceptance threshold would then be increased (not decreased) to yield the same effect; namely, that the hypothesis or components of the hypothesis are more likely to be accepted by the system.

Referring to FIG. 2, in step 210, the most likely sequence of words (highest confidence factor), as determined by the search 208, is compared to the expected response. As noted above, the matching algorithm requires that a hypothesis is accepted only if its confidence factor exceeds an acceptance threshold 214. As part of the invention, in step 212, the acceptance threshold is adjusted, such as by being lowered, if the hypothesis matches the expected response. In such a case, the hypothesis 111 may initially have a confidence factor that is too low to have the hypothesis accepted by acceptance algorithm 112, and the operator would have had to repeat the response. However, in accordance with the principles of the present invention, if the otherwise rejectable hypothesis compares favorably to the expected response, the threshold is lowered. If the threshold is lowered enough, the most likely hypothesis is now recognized and accepted, in step 216, as recognized speech because its confidence factor exceeds the lowered acceptance threshold. There may still continue to be circumstances in which speech input received is not recognized even if prior knowledge of an expected response is available and the speech compared well with the expected response. For example, the threshold may not be lowered enough for the hypothesis to be accepted. In such an instance, the speech input is rejected in step 218, and the user repeats the speech input.

An example of the invention is useful to illustrate its features. For example, a user may be directed to a particular bin or slot and asked to speak the check-digits assigned to that bin or slot to verify his location in a warehouse. For the purpose of this example, we assume that the check-digit is "one one". The acceptance threshold for the system is set to 1.5. Various scenarios may arise in this situation.

In the first scenario, the user speaks the correct check-digits and the search algorithm produces "one one" as the top hypothesis, with a confidence factor of 2. In this case, the check-digits are accepted because the confidence factor exceeds the acceptance threshold and the user continues with the task.

In the second scenario, the user speaks the correct check-digits and the search algorithm again produces "one one" as the top hypothesis. However, in this later scenario, the hypothesis is only assigned a confidence factor of 1. Without the invention, this hypothesis would normally be rejected because the confidence factor is lower than the acceptance threshold of 1.5. The user would then be asked to repeat the speech causing delay or inefficiency.

With the invention, the system adapts. Specifically, the system may know the expected check-digit response from the user based on knowledge of the bin or slot. The invention makes a comparison of the top hypothesis to the expected response for the user. If the hypothesis matches the expected check-digit response for the user's location, the acceptance threshold is lowered, such as to 0.5 for example. Now the confidence factor (1) exceeds the acceptance threshold (0.5). The check-digit response of "one one" is then accepted and the user continues with the task without having to repeat the check-digits. This change constitutes savings of time leading to higher efficiency and productivity.

In a third scenario, the search algorithm produces incorrect check-digits as its top hypothesis (either the user said the wrong check-digits or the speech was recognized incorrectly or the hypothesis was produced due to background noise and not user speech), e.g. "one two", with a confidence factor of 1. Since the hypothesis does not match the expected check-digits at the user's location (i.e., bin/slot), the acceptance threshold is not adjusted or lowered. Therefore, since the confidence factor is below the acceptance threshold, the hypothesis is rejected. Therefore, the invention does not cause acceptance of the wrong response.

In a fourth scenario, the search algorithm produces incorrect check-digits as its top hypothesis (either the user said the wrong check-digits or the speech was recognized incorrectly or the hypothesis was produced due to background noise and not user speech), e.g. "one two." However, now the hypothesis has a confidence factor of 2. Since the confidence factor exceeds the rejection threshold (1.5), the hypothesis is accepted and the user is alerted that the check-digits are incorrect. As may be appreciated, there are numerous other situations where there is an expected response that would lead to adjusting the acceptance threshold. The example provides a single illustration of the invention and is not meant to limit the situations where it may be useful.

Thus, according to the method detailed in FIG. 2. Speech input is first analyzed and processed by the recognizer to determine the most likely match or hypothesis. Unlike previous methods that simply assign a probability to this hypothesis, the present invention compares the hypothesis to a predetermined value (or values), such as the expected response. If the expected response and the hypothesis are essentially the same, then the acceptance threshold for the hypothesis is adjusted such that speech recognition and acceptance is more likely.

There are a variety of ways to include knowledge about an expected result within a speech recognition application for the purposes of the invention. For example, when developing the software, the developer may include this information in tables or other data structures that are referenced at different points in the execution of the application. For example, the program may know where in its execution it is to look for a "YES" or "NO" answer. Additionally, or alternatively, the information about the expected result can be calculated dynamically using programming logic included in the speech recognition application. For example, it is well known that the accuracy of a credit card number can be calculated based on a particular checksum algorithm. In such an example, the speech recognition program would not need to have all the checksums precalculated beforehand, but can implement the checksum algorithm dynamically to calculate a value on-the-fly as needed. In another example, the program may know the location (bin/slot) that a user has been sent to and may then know the specific check-digits to look for in the expected response. This on-the-fly information is still available as "prior knowledge" with which to evaluate the speech received by a user, and thus the present invention may use pre-stored expected responses or dynamically developed expected responses. Referring to FIG. 1, the expected response 114 may be used by the acceptance algorithm and may be retrieved from memory or calculated dynamically by system 100 in order to compare it to the hypothesis.

The amount by which the acceptance threshold is adjusted can be determined in various ways according to embodiments of the invention. In one embodiment, the voice development tool or API used to implement system 100 can provide a means for the application developer to specify the adjustment amount. For example, a fixed amount of threshold adjustment 116 may be built into the system 100 and used by acceptance algorithm 112 as shown in FIG. 1. Alternatively, the recognition system or application can be configured to automatically calculate an appropriate adjustment amount to lessen the knowledge needed by the application developer and prevent inappropriate use of the features of the invention.

For example, in one embodiment, to guard against the expected response being accidentally produced and accepted by the recognition system, the adjustment of the acceptance threshold may be dynamically controlled by an algorithm that takes into account the likelihood of the recognition system accidentally producing the expected response. For example, in one such embodiment, the present invention contemplates at least two independent components of such a threshold adjustment algorithm: the number of vocabulary items at the point in the application where the expected response is used (the breadth of the search), and the number of vocabulary items in the expected response (the depth). For example, if there are only two possible responses (e.g., a "yes" or "no" response) with one being the expected response, then the adjustment to the acceptance threshold could be made very small because the recognizer is looking for a single word answer (depth=1) from only two possibilities (breadth=2). Alternatively, in such a scenario, the system 100 could be configured to provide no adjustment to the acceptance threshold, because with such a low depth and low breadth, there is a higher chance of the system producing the expected response by accident.

However, in another recognition scenario, if there are a hundred possible responses (e.g., a two-digit check-digit), then the probability of producing the expected response by accident would be smaller and the adjustment to the acceptance threshold therefore may be made more significant. For example, two check-digits will have a hundred possible responses (10 possibilities×10 possibilities) making a breadth 100 and a depth of 2 for the two check-digits. This would allow a more significant threshold adjustment to be used.

In another embodiment, the threshold adjustment may depend on how likely the user is to say the expected response. If, in a particular application, the user says the expected response 99% of the time, the threshold adjustment may be greater than in applications where the user's response is not as predictable. For example, if the user goes to the proper spot or location in a warehouse most of the time or is asked to speak a password, it may be desirable for the system to use a greater adjustment, because the response will usually be correct. However, if the system is less sure of the response to be received, less adjustment to the threshold will be used to prevent improper acceptance of a response. The system 100 could thus dynamically vary the threshold adjustment amount accordingly based on the likelihood of the user saying the expected response. The likelihood of the user saying the expected response could be determined ahead of time or dynamically and/or automatically estimated based on actual usage patterns.

For example, in the check-digits scenario described earlier, the probability (Pe) that the invention causes the user to pick an item from the wrong slot by incorrectly accepting the hypothesis as the expected response is given by, $$Pe = Pa * Pb * Pc * Pd$$

Where:
Pa is the probability that the user is at the wrong slot or shelf,
Pb is the probability that the top hypothesis is not what the user said,
Pc is the probability that the misrecognition matches the expected response, and
Pd is the probability that the confidence factor is less than the acceptance threshold but higher than the adjusted acceptance threshold for incorrect hypotheses.

Pa, Pb, Pc, and Pd depend on many factors including (but not limited to) the following:
Pa: user, the site layout, etc.

Pb: the accuracy of the speech recognizer and the speech pattern of the user
Pc: the depth and breadth of the grammar at the given instance
Pd: the distribution of the confidence scores, the acceptance threshold, and the acceptance threshold adjustment.

It is easy to see that to control Pe by means of the threshold adjustment, the other probabilities need to be estimated. Pa, Pb, Pc, and Pd may be static quantities or may be adjusted dynamically as the system observes a given user's patterns.

For example, if the system notices that a user is more prone to go to an incorrect shelf, it would adjust its estimate of Pa higher. To maintain the same Pe, the system would then change its adjustment to the acceptance threshold to make Pd lower. Therefore, the amount of the threshold adjustment may be dynamically determined. This is just one of many possible ways and a person of ordinary skill in the art will appreciate that the other factors can also affect the threshold adjustment according to the formula noted above.

In still another embodiment, the acceptance threshold adjustment amount can also be determined by taking into account the "cost" of the recognizer making an error. A smaller adjustment would be used when the cost is greater, to prevent errors as described above where an incorrect hypothesis is mistakenly recognized as the expected response. For example, the invention could be used on the passcode for a rocket or missile launcher or in a scenario to confirm a warehouse worker's location when picking health and beauty products. The "cost" of making a mistake in the rocket example is much higher than in the warehouse example. Thus, all other components/factors being equal, the adjustment amount used for the rocket example should be chosen to be less than the adjustment for the warehouse example. In practice, this cost of mistakenly recognizing the expected response must be balanced against the cost of requiring that the operator repeat the speech input 102.

In one embodiment of the invention, the cost of mistakenly recognizing the hypothesis as the expected response can be expressed as:

$$C_{e1,avg} = C_{e1} * Pe$$

Where:
$C_{e1}$ is the cost for mistakenly recognizing the expected response, and
$C_{e1,avg}$ is the average cost for mistakenly recognizing the expected response. This is compared with the average savings that the invention generates by preventing the operator from having to repeat the speech input when he's at the correct location and says the correct check-digits, S.

$$S = C_{rep} * (1-Pa) * (1-Pb) * Pf$$

Where Pa and Pb are as defined above.
$C_{rep}$ is the cost of the operator having to repeat himself, and Pf is the probability that the confidence factor is between the unadjusted and adjusted acceptance thresholds for correct hypotheses.

In still another embodiment, the system 100, through the use of the invention and a threshold adjustment, may be used to effectively override the acceptance algorithm. For example, in those scenarios wherein the cost of a wrong answer is insignificant in the context of the application, the reduction to the threshold can effectively be infinite. That is, the recognizer would accept the hypothesis, (which equals the expected response) regardless of how its confidence factor relates to the threshold.

In accordance with another aspect of the invention, a related tool allows a voice application developer to specify the expected response for the system. (Herein, "voice application developer" or "developer" is used to refer to the user of the voice application development tool, i.e. the person who creates or programs the voice application. The developer is not to be confused with the user of the voice recognition system 100.) Voice application development tools allow a voice application developer to specify what vocabulary items and grammar are available to be recognized at a given point of a dialog. At least one such voice application development tool 101 exists separate and apart from the speech recognition system 100. The outputs of the tool 101 are used by the speech recognition system 100 to define the behavior of the speech recognition system. For example, using an interface of the voice application development tool, a developer specifies what information is to be delivered to a user of the speech recognition system, such as what sentences or questions the system will prompt the user for. The developer also specifies what responses the speech recognizer should attempt to recognize. For example, using a voice application development tool 101, a developer can specify that the voice application prompts the user "What is the check-digit?" and that the voice application should listen for the vocabulary items "one", "two", "three", "four", "five", or "six." Referring to FIG. 1, system 100 may be designed such that models for responses, which the user may say 110 are available to the search algorithm 108, or other components of the system at the proper juncture in the application dialog. In accordance with the invention, the tool also provides the developer the means to specify certain expected responses 114 in the system. For the example above, the tool would allow the developer to specify that the expected response is the correct check-digit (e.g. "one"). In another aspect, the voice application development tool may be used to allow the operator to specify one or more expected responses in the form of an expression or expressions that the tool 101, speech recognition system 100 or voice application knows how to evaluate to come up with expected response(s). The expressions may, for example, contain constants, mathematical or string functions, table lookups, and application variables. As noted above, with the invention, the voice application development tool interface may also allow the voice application developer to specify the threshold adjustment amount or any values used to calculate it for each expected response. The tool 101 has an appropriate processing function for processing information that is input by the developer through the tool interface to generate an output. The voice application development tool 101 stores at least one of the following in its output for use by the speech recognition system 100: the specification of the expected response (i.e. the expression(s) that are later evaluated to yield the expected response), the adjustment amounts, and values that can be used for calculating the adjustment amounts. The system might use the latter to dynamically set the adjustment amount.

Figure 3:
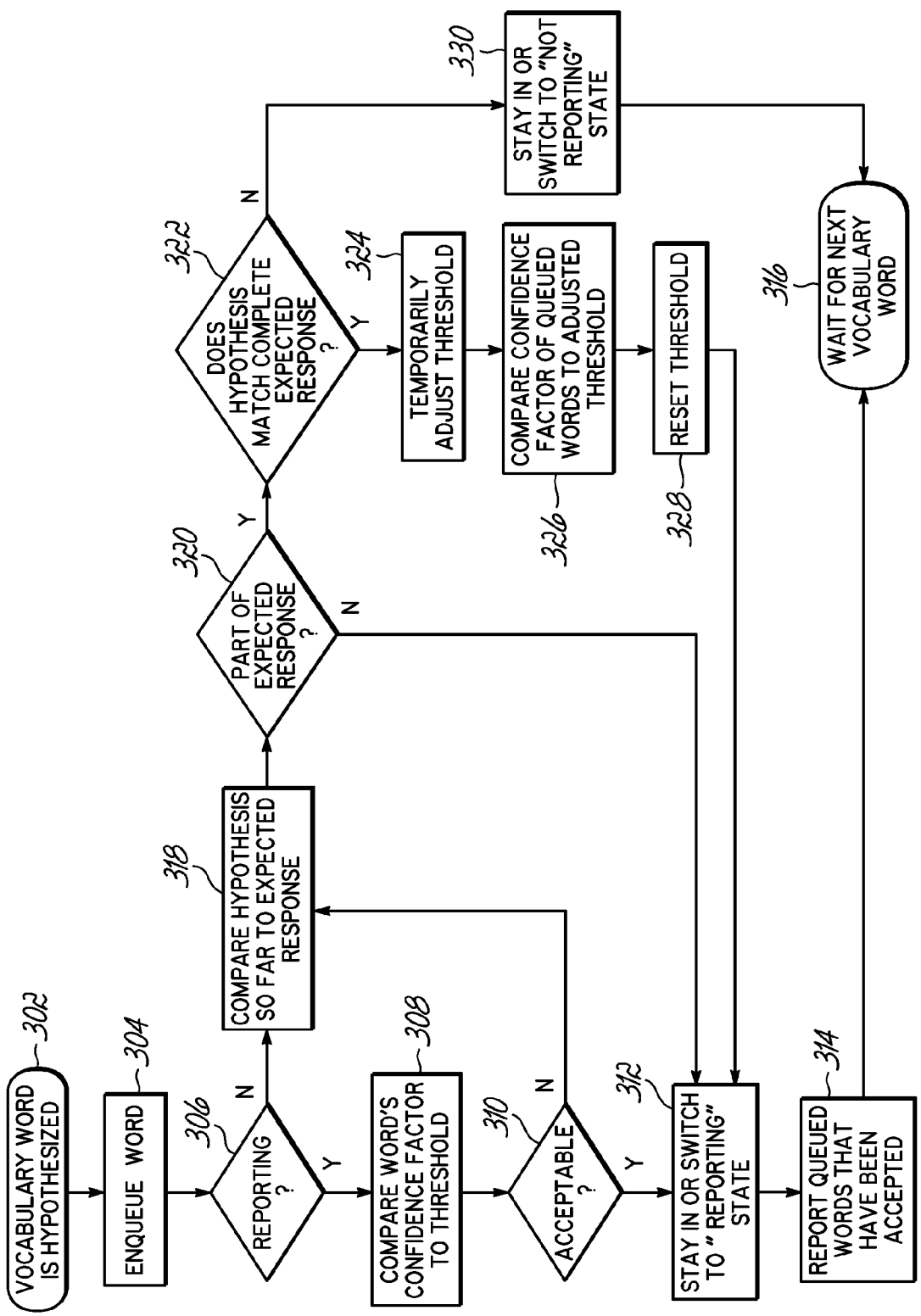
FIG. 3 illustrates a flowchart of an exemplary algorithm for using the invention in speech recognition systems where words are reported individually as they are recognized.

FIG. 3 illustrates another aspect of the present invention wherein the confidence factors of words or other parts of a multi-word input utterance are individually compared to an acceptance threshold. In this embodiment, under certain circumstances, the decision on whether to accept and report an individual word is delayed in order to take advantage of the expected response features of the invention. Specifically, the decision on whether to accept words whose confidence factors are not initially above the acceptance threshold is delayed until it is known that either the hypothesis matches the complete expected response or the hypothesis does not match the expected response. In speech recognition systems where words are reported individually as soon as they are determined, this aspect of the invention provides the benefit that words continue to be reported as soon as possible, minimizing system response time, except in those instances when the expected response features of the invention take effect to help recognition performance. For example, it may be that a three or four word utterance has one word whose confidence factor does not immediately exceed the acceptance threshold, whereas other words in the utterance have confidence factors that exceed the acceptance threshold and are thus accepted. The invention provides acceptance of the hypothesis based upon the expected response even if one or more words are initially rejected. While the example below utilizes a three-word utterance with only one word initially below the acceptance threshold, the invention is not so limited.

Referring to FIG. 3, as an utterance is spoken, the speech recognition search algorithm 108 generates individual words (or vocabulary items) of a hypothesis, as set forth in step 302. For example, in response to being prompted to speak check-digits, a user might speak the check-digits 125 or "one," "two," "five", and the search algorithm might produce a hypothesis consisting of the words "one", "two", and "five", one word at a time. However, for any number of various reasons, the system 100 may not have a high confidence that the user spoke the word "two". In accordance with the principles of the present invention, the system may know that the expected response for the check-digits is "one, two, five", and may utilize the expected response feature of the invention to ensure that the speech of the user is properly recognized and accepted despite one or more words having a confidence factor or value that is below an acceptance threshold.

Referring again to FIG. 3, an utterance is spoken by a user and the search algorithm 108 produces a hypothesis consisting of individual vocabulary words. The system generates confidence factors for the words of the hypothesis. As the search engine produces each word, the system can queue or otherwise store each word for immediate or later processing as described below, as indicated by step 304. As the utterances begin, the system will generally be in a Reporting state, and thus flow will continue through step 306 to step 308. The first vocabulary word in the utterance "one two five" is the word "one." For the portion of the hypothesis corresponding to the word "one," the confidence factor is compared to an acceptance threshold (step 308). In the present example, the word "one" has a sufficiently high confidence factor to exceed the acceptance threshold and, thus proceeds through step 310 as an accepted word. As such, the system stays in the Reporting state (step 312) and the word "one" is reported in step 314. The system then proceeds to wait for the next word in the utterance as noted in step 316.

In the example, the utterance continues because three digits of the number 125 were spoken. With the recognition of the vocabulary word "two" the system queues or otherwise stores the vocabulary word "two" and its confidence factor. As the system is still in the Reporting state, it thus proceeds through step 306 to step 308. However, in this example, the word "two", with its low confidence factor as noted above, does not pass the acceptance criteria. Pursuant to step 310, the word "two" is not acceptable or is initially rejected. In such a case, in accordance with the principles of the present invention, the system progresses on a path to step 318 so that the portion of the hypothesis or utterance string, which at this stage includes the words "one two," is compared to the beginning portion of the expected response. Since the expected response is "one two five", the first parts or portion of the hypothesis compare favorably to the first parts or portion of the expected response, such that the portion of the hypothesis generated so far is considered to be part of the expected response, as noted in step 318. Because the hypothesis is part of the expected response, the invention progresses through step 320 to step 322. In step 322, the hypothesis generated so far is compared to the expected response in its entirety. Since the hypothesis "one two" does not match the complete expected response "one two five", the flow proceeds to step 330, where the system is switched to a "not reporting" state. Then the system waits for the next vocabulary word of the hypothesis in step 316.

The system waits in step 316 until the next word is received. In the example, the next word is "five." The vocabulary word encounters this system now in the Not Reporting state (step 306). Therefore, the system progresses to step 318 where the hypothesis string, that now includes the words "one, two, five", is compared to the beginning portion of the expected response, which is "one two five". Since the utterance string is part of the expected response pursuant to step 320, the next determination to be made is whether the complete expected response has been received. In this example, the last word "five" completes the expected response and, thus, pursuant to step 322, the system proceed to step 324 wherein the acceptance threshold is lowered or otherwise appropriately adjusted, and the confidence factor of each queued word is compared to the adjusted threshold (step 326). In one example, the lowering of the acceptance threshold may have been sufficient so that the spoken "two" was now accepted. Therefore, all words "one, two, five" are accepted. Alternatively, if the threshold was not lowered enough, then the "two" would not be accepted. The threshold is reset to its original value in step 328, and pursuant to step 312, the system switches to a Reporting state. In step 314, words that have been queued and are now accepted are reported as recognized words. In the example just given, because the utterance compared favorably to the expected response and the confidence factor of each word of the hypothesis met the adjusted acceptance threshold, the entire utterance (e.g., the three words "one two five") is reported as being accepted.

In an alternative example, one or more of the words might not be part of the expected response. For example, the middle word might have been heard and recognized as "three" rather than "two." In this case, the utterance detected or hypothesis is "one three five." If "one" is initially accepted and "three" is not accepted because it has a low confidence factor, then flow would proceed through steps 308 and 310 to step 318. Then, pursuant to a comparison to the expected response (step 318), it would be determined that the partial hypothesis "one three" was not part of the expected response (step 320). Then, the system would not adjust the threshold, switch to a "not reporting" state, nor delay the decision on this word. As such, if a word is initially rejected and is not part of the expected response, the word would not be accepted. If the last word spoken was actually "five" but was initially rejected and "one two" has been accepted, the word "five" may be stored according to the principles of the invention (step 304) and thereafter re-evaluated against a lower threshold value (step 326). In this example, the "five" is only stored long enough to test it with the adjusted threshold, since it matches the last word of the expected response. Although one feature of the invention is that the reporting of accepted words is sometimes delayed, this example illustrates that the invention does not always delay the reporting of accepted words.

As such, the present invention is able to analyze individual words of a multi-word utterance and instead of initially rejecting all or part of the utterance because one or more words are not initially accepted, it is able to queue or store the unaccepted words and then make a later comparison or analysis based upon how the utterance matches against the expected response string. In that way, the invention is able to accept the properly spoken expected response even though one or more words have confidence factors that do not compare favorably against the initial acceptance threshold, but do compare favorably against the adjusted threshold.

Thus, while the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept. For example, the exemplary speech recognition system described herein has focused on wearable wireless terminals. However, the principles of the present invention are applicable to other speech recognition environments as well.

What is claimed is:

1. A method for recognizing speech, the method comprising the steps of:
   analyzing speech input with an apparatus using at least one hardware-implemented processor to generate a hypothesis including multiple elements;
   generating respective confidence factors for the multiple elements of the speech input;
   comparing a confidence factor for at least one of the elements to a threshold for accepting the element as properly recognized; and
   if the element is not accepted in the comparison, comparing at least a portion of the hypothesis containing the unaccepted element to at least a portion of an expected response;
   if the comparison of the portion of the hypothesis containing the unaccepted element with the portion of the expected response is favorable, storing the unaccepted element for subsequent analysis and proceeding to further analyze another element of the hypothesis.

2. The method of claim 1 wherein the elements include one or more words that make up the speech input.

3. The method of claim 1 wherein each element is an individual word.

4. The method of claim 1 further comprising, after storing at least one unaccepted element for subsequent analysis, adjusting the acceptance threshold and comparing the confidence factor for at least one stored element to the adjusted acceptance threshold.

5. The method of claim 1 further comprising, if the comparison of the portion of the hypothesis containing the unaccepted element with the portion of the expected response is not favorable, rejecting at least a portion of the hypothesis.

6. The method of claim 5 further comprising proceeding to analyze elements of the hypothesis until the full hypothesis is analyzed or a portion of the hypothesis is rejected.

7. The method of claim 1 further comprising the step of either increasing or decreasing the acceptance threshold based on the favorable comparison of the hypothesis portion to the expected response.

8. The method of claim 1, further comprising comparing the confidence factors of elements in the hypothesis to an acceptance threshold in a sequential fashion.

9. The method of claim 4 wherein an adjustment amount for the acceptance threshold is a fixed amount.

10. The method of claim 4 wherein an adjustment amount for the acceptance threshold is a variable amount.

11. The method of claim 1 further comprising generating the hypothesis in an element-by-element fashion, and the subsequent analysis for a stored element being performed after generating the next element in the hypothesis.

12. A system for recognizing speech, comprising:
    a hardware-implemented processor that has a speech recognizer configured to analyze speech input and generate a hypothesis of multiple elements and respective confidence factors for the multiple elements;
    an acceptance algorithm that compares the confidence factor of at least one element to an acceptance threshold for accepting or not accepting the element;
    an adjustment component that compares at least a portion of the hypothesis containing an element that is not accepted to at least a portion of an expected response; and
    if the comparison of the portion of the hypothesis containing the unaccepted element with the portion of the expected response is favorable, the system operable for storing the unaccepted element for subsequent analysis and proceeding to further analyze another element of the hypothesis.

13. The system of claim 12 wherein the elements include one or more words that make up the speech input.

14. The system of claim 12 wherein each element is an individual word.

15. The system of claim 12 wherein the adjustment component, after at least one unaccepted element is stored for subsequent analysis, adjusts the acceptance threshold and compares the confidence factor for at least one stored element to the adjusted acceptance threshold.

16. The system of claim 12 wherein the system rejects at least a portion of the hypothesis if the comparison of the portion of the hypothesis containing the unaccepted element to the portion of the expected response is not favorable.

17. The system of claim 12 wherein the system generates the hypothesis in an element-by-element fashion, and the subsequent analysis for a stored element is performed after the speech recognizer generates the next element in the hypothesis.

18. A method for recognizing speech, the method comprising the steps of:
    analyzing speech input with an apparatus using at least one hardware-implemented processor to generate a hypothesis of multiple elements and respective confidence factors for the multiple elements;
    comparing each said confidence factor to a threshold for accepting the element; and
    comparing at least a portion of the hypothesis to at least a portion of an expected response;
    if the comparison is favorable, adjusting a threshold for one or more of the elements in order to affect the acceptance of the one or more elements.

* * * * *